March 9, 1948.　　　O. K. STAIGER　　　2,437,486
MATERIAL-HANDLING APPARATUS
Filed July 27, 1944　　　3 Sheets-Sheet 1
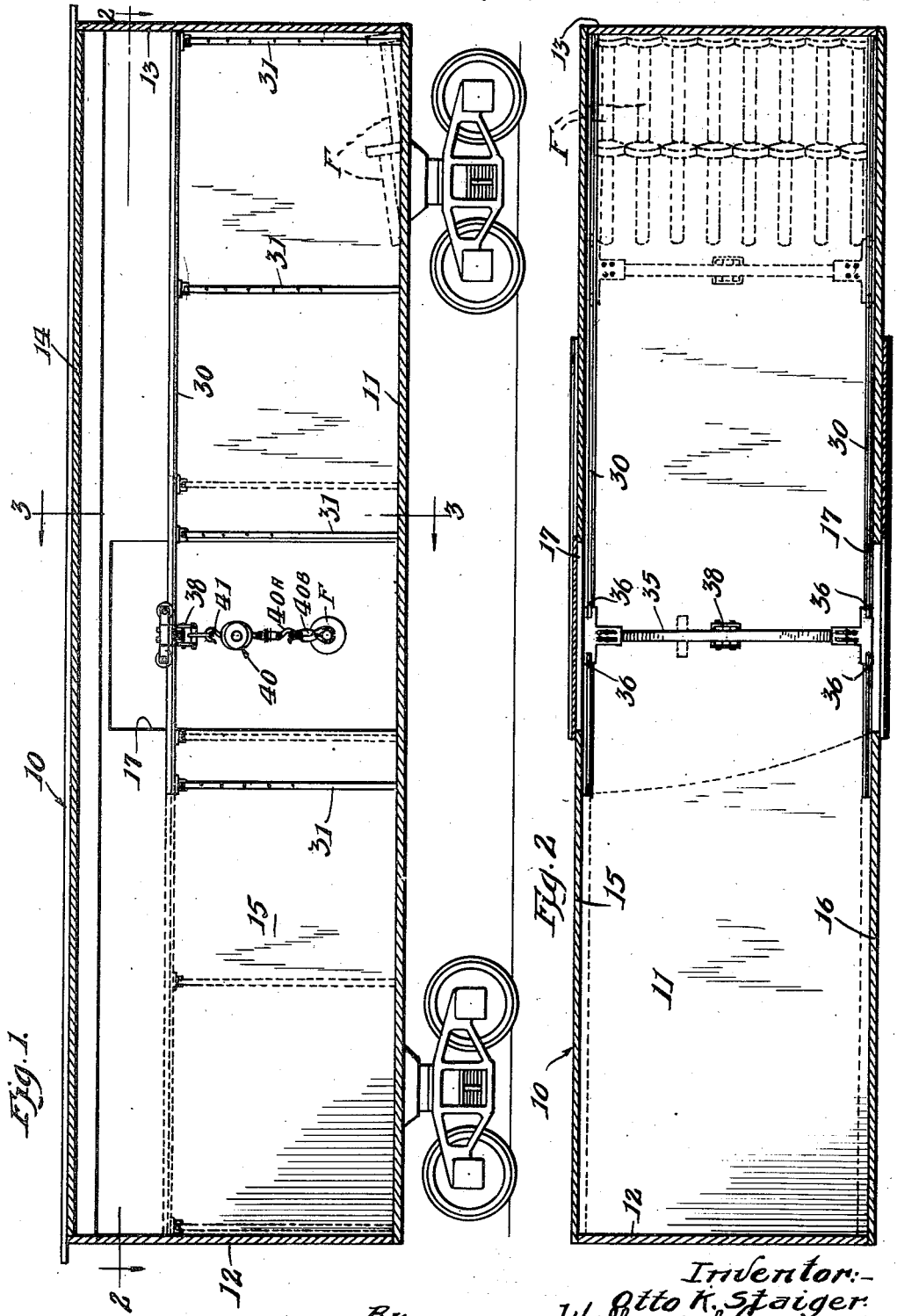

March 9, 1948.  O. K. STAIGER  2,437,486
MATERIAL-HANDLING APPARATUS
Filed July 27, 1944  3 Sheets-Sheet 2

Inventor:
Otto K. Staiger.
Wallace and Cannon
Attorneys.

March 9, 1948.  O. K. STAIGER  2,437,486
MATERIAL-HANDLING APPARATUS
Filed July 27, 1944  3 Sheets-Sheet 3
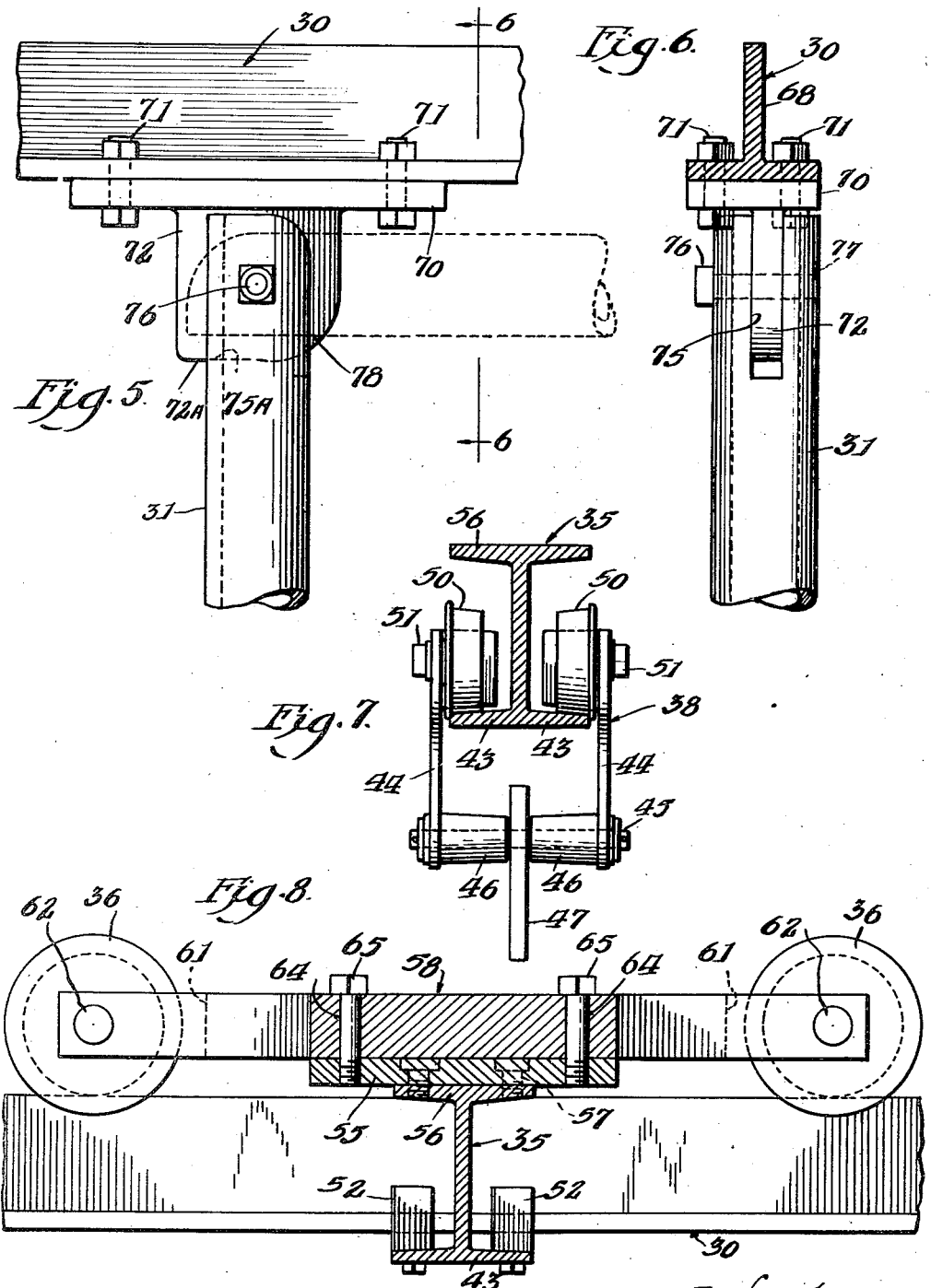
Inventor:-
Otto K. Staiger.
Wallace and Cannon
BY. Attorneys.

Patented Mar. 9, 1948

2,437,486

UNITED STATES PATENT OFFICE 2,437,486

MATERIAL-HANDLING APPARATUS

Otto K. Staiger, Chicago, Ill., assignor to American Brake Shoe Company, Wilmington, Del., a corporation of Delaware Application July 27, 1944, Serial No. 546,823

6 Claims. (Cl. 104—98)

This invention relates to material-handling apparatus and more particularly it relates to apparatus for handling relatively heavy articles in the loading or unloading of boxcars and the like.

When relatively heavy and cumbersome articles are to be loaded into a boxcar or the like, it is necessary that such articles be distributed relatively evenly throughout the boxcar, and while conventional material-handling equipment in most factories enables such heavy or cumbersome articles to be conveniently moved into the central portion of a boxcar, the matter of moving and distributing such articles throughout the opposite end portions of the car has heretofore involved relatively difficult and tiring lifting operations that were performed manually by the workmen. It is therefore an important object of this invention to simplify the loading and unloading of boxcars and the like so as to enable heavy and cumbersome articles to be readily transported from the central portion of a boxcar to the end portions thereof, and a related object is to enable such articles to be readily moved and distributed over the floor area of such a boxcar. A further object of the invention is to simplify not only the loading of boxcars and the like, but also the unloading thereof, and a related object is to reduce the cost as well as the physical hazards of such loading or unloading operations.

Where a boxcar or the like is to be loaded with relatively heavy articles, this must be accomplished in such a way that the apparatus employed in such loading operations may be readily removed from the car upon completion of the loading operations, and to enable this to be done is a further object of this invention. Another and related object is to enable material-handling apparatus to be so constructed and arranged that it may be readily placed in and removed from a boxcar or the like, and to enable this to be accomplished even though the articles loaded in the car are disposed relatively close to the side walls of the car. A further object of the invention is to enable material-handling apparatus to be so constructed that the mounting thereof with a boxcar may be accomplished in a relatively simple manner and in a minimum of time and with a minimum number of workmen, and a related object is to enable such apparatus to be easily supported from the floor of the car and without complicated attaching operations which might tend to mutilate the interior of such a car. A more specific object of the invention is to enable material-handling apparatus to be so constructed and arranged that the parts thereof cooperate in maintaining the apparatus in the desired position and relationship thereof within the car. A still further object is to enable such apparatus to readily lift and distribute heavy articles throughout the entire width of a boxcar or the like, and a related object is to enable such apparatus to accomplish such full width distribution of the articles in boxcars of different widths.

Another important object of this invention is to provide material-handling apparatus that is simple in construction and relatively light in weight and which may be readily moved and transported from one car to another as required, and a more specific object is to enable such apparatus to be disassembled into a plurality of elements or units that can be conveniently handled and carried by the workmen in the course of erection or dismantling of the apparatus.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a longitudinal vertical sectional view through a boxcar having material-handling apparatus of the present invention mounted therein;

Fig. 2 is a plan view taken in section substantially along the line 2—2 of Fig. 1;

Fig. 5 is a fragmental elevation view showing the manner in which the side rails of the apparatus are supported upon the posts;

Fig. 6 is a sectional view taken substantially along the line 6—6 of Fig. 5;

Fig. 7 is a fragmental sectional view taken along the line 7—7 of Fig. 3; and

Fig. 8 is a fragmental vertical sectional view taken substantially along the line 8—8 of Fig. 3.

Figure 3:
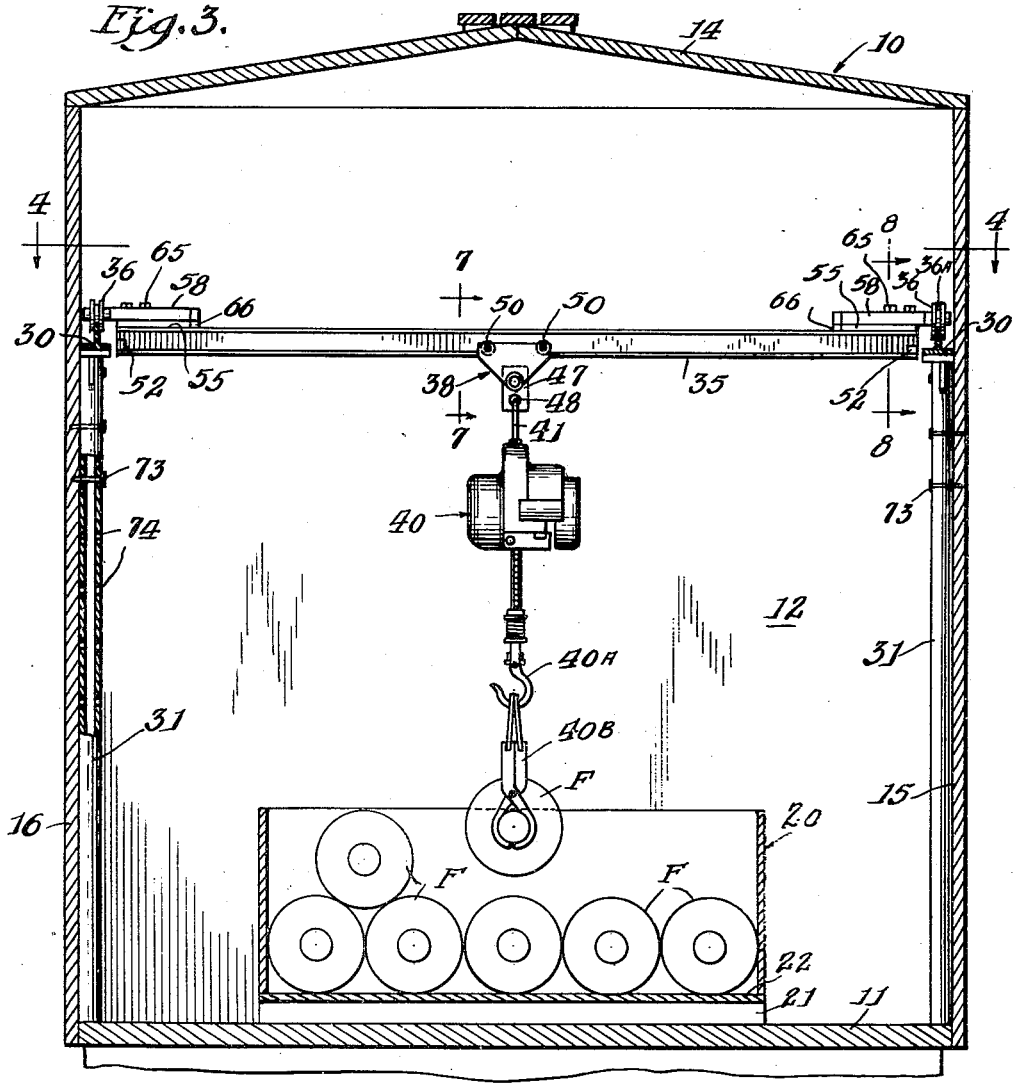
Fig. 3 is a vertical sectional view of the boxcar shown in Fig. 1, the view being taken along the line 3—3 of Fig. 1 so as to illustrate the relationship of the apparatus transversely of the car.

In the form chosen for disclosure herein the invention is embodied in material-handling apparatus that is particularly adapted for convenient and economical loading and unloading of railway boxcars of conventional size and design, and in Figs. 1 to 4 of the drawings such apparatus is illustrated in its erected condition within a boxcar 10. The car 10 has a floor 11, end walls 12 and 13, a roof 14, and side walls 15 and 16 in the mid-portions of which side door openings 17 are provided in the conventional manner. Thus in the loading of the car 10, the material or articles that are to be shipped must be moved into the car through one of the side doors 17 and must then be moved into the end portions of the car so as to be relatively evenly distributed over the floor area of the car. The transportation of the material into the central portion of the car 10 through the side doors 17 may be readily accomplished through the use of conventional power operated lifting and transporting trucks such as those in common use in most factories, and it is with the distribution and carrying of the material or objects from the central portion of the car into the ends of the car that the present invention is concerned. Thus, the articles to be handled may be stored or collected in the factory in boxes 20, Fig. 3, having supports 21 along opposite sides thereof so as to support the bottom wall 22 thereof in spaced relation to the floor, and the lifting platform of a conventional lift truck may be run into position beneath the bottom 22 of the box 20. The box 20 may thus be run into position on the floor of the car 10 between the two doors 17, and the individual articles such as forgings F may then be lifted from the box 20 and distributed over the floor area of the car.

In accordance with the present invention, the articles that have thus been located in the central portion of the car 10 are lifted and then moved into the proper position in the end portions of the car by means that are installed in the car during the loading operation and which are then removed from the car. In accordance with this invention the lifting and conveying means are of such a character that they may be easily installed in the car by two workmen and such installation may be quickly accomplished. Moreover, the lifting and conveying apparatus of this invention may be readily removed from the car after the loading operations have been completed. In attaining such advantageous results, the present invention provides material-handling apparatus embodying two side rails 30 that are adapted to extend longitudinally of the car 10 adjacent to the inner faces of the side walls 15 and 16 thereof, the rails 30 being supported in elevated positions along the side walls of the car by posts 31 that rest upon the floor of the car. In order that the installation of the side rails 30 may be readily accomplished, such rails are constructed of such a length that they extend from the central portion of the car to one end of the car, and through this arrangement, each rail 30 may be made of a single or continuous piece of metal and the rail may be readily moved into or out of the car merely by moving the rail into an angular position so that it extends from one corner of the car and toward the door 17 on the opposite side of the car. The side rails 30 are arranged to act as a supporting and guiding means for a movable cross rail or beam 35 which is supported and guided on the rails 30 by guide wheels 36 mounted on opposite ends of the cross beam 35 and arranged to roll along the rails 30. The cross beam 35 serves as a supporting track or rail for a roller carriage 38 from which a hoisting means such as a motor-driven chain hoist 40 may be suspended. The weight lifting hook 40A of the hoist 40 may be equipped with lifting tongs 40B of a size and shape that is suited for grasping the particular kind of object or article that is to be handled, thus to simplify the lifting and moving of such objects. The roller carriage 38 may, of course, be moved along the rail or cross beam 35 transversely of the car, while the cross beam 35 may be moved longitudinally of the car along the supporting and guiding rails 30, and hence an object or article such as a forging F may be lifted from the box 20 at the center of the car and may then be transported easily and quickly into any desired position in the end of the car, and by this arrangement, the articles such as the forging F may be distributed evenly over the floor area of the car.

It has been pointed out hereinbefore that the lifting and conveying apparatus of the present invention is of such a character as to be easily placed in or removed from position within the boxcar that is to be loaded or unloaded, and to enable this to be accomplished, the elements of the apparatus are arranged so as to be separable into parts or units of such size and weight that they may be readily carried and handled by the workmen. Thus, the hoist 40 is suspended from the roller carriage 38 by means such as a hook 41 so that the hoist 40 may be removed and carried as a unit from the car when the apparatus is being dismantled.

The roller carriage 38 is in the present instance permanently but movably mounted upon the cross beam 35, and as will be evident in Figs. 3 and 7, the cross beam 35 is afforded by an I-beam that is disposed with its central web in a vertical plane. The lower flange 43 of the I-beam thus may be employed as a supporting track for the roller carriage 38. The roller carriage 38 is therefore provided by a pair of generally triangular plates 44 connected together at their lower edges by a connecting pin 45 and spacer sleeves 46, a plate 47 being suspended on the pin 45 between the adjacent ends of the spacer sleeves 46 so that the hook 41 may be engaged with a relatively large aperture 48 formed in the plate 47. Along its upper edge each plate 44 has a pair of flanged rollers 50 mounted in spaced relation on suitable studs 51, and the rollers 50 on the respective plates 44 are arranged to ride upon the upper surfaces of the flange 43 of the cross beam 35. Thus the roller carriage 38 may be moved along the cross beam 35 throughout the entire length thereof, suitable stops 52 being welded upon the upper faces of the flange 43 near the ends of the cross beam so as to prevent the roller carriage 38 from running off the ends of the cross beam 35.

The side rails 30 of the present apparatus are supported adjacent to the side walls 15 and 16 of the car, and since there is some variation in the internal width of standard boxcars, provision is made whereby the distance between the rollers 36 at opposite ends of the cross beam 35 may be adjusted, thereby to enable proper engagement of these rollers with the side rails even though the spacing between these side rails may vary because of variations in the width of the cars that are encountered in use. Thus, as shown in Figs. 2, 3, 4 and 8, the rollers 36 are so mounted on the cross beam 35 that the desired adjustment between the pairs of rollers may be effected. In affording such an adjustable mounting, a mounting plate 55 is secured on the top of the upper flange 56 of the cross beam 35 at each end thereof by means such as headed screws 57, and the rollers 36 are mounted in T-shaped mounting members 58 that are adjustably secured upon the upper faces of the respective mounting plates 55. Thus each of the T-shaped members 58 has a body 59 with oppositely extending arms 60 at one end thereof, and the arms 60 have slots 61 formed therein so that the guide wheels 36 may be disposed in the slot 61 and may be rotatably supported in such relation by bearing shafts 62. The body portion 59 of each of the T-shaped members 58 is disposed so as to overlie the upper face of one of the mounting plates 55, and parallel mounting slots 64 are provided in the body member 59. The slots 64 are disposed perpendicular to the arms 60, and clamping screws 65 are extended downwardly through the slots 64 and are threaded into the mounting plate 55 so that the T-shaped member 58 may be adjusted longitudinally with respect to the axis of the cross beam 35 and may be secured in a desired position of adjustment by the clamping screws 65. To aid in the guiding and positioning of the member 58 with respect to the mounting plate 55, guide blocks 66 are preferably extended downwardly from opposite sides of the body 59 so as to engage the side surfaces of the mounting plate 55 upon which it is supported.

Figure 4:
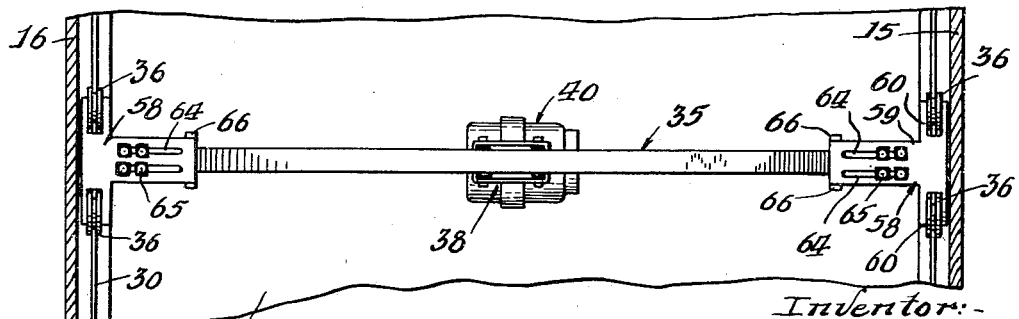
Fig. 4 is a fragmental plan view taken in section substantially along the line 4—4 of Fig. 3.

As will be evident in Figs. 3, 4 and 8, the guide rollers 36 have grooves 36A formed therein so that these guide rollers will in effect interlock with the side rails 30, and by this arrangement, the interengagement of the rollers 36 with the guide rails 30 serves to maintain the guide rails 30 in the desired spaced relationship wherein they lie close to the opposite walls of the car. In the present instance, the guide rails 30 are afforded by conventional T-bars that are disposed in an inverted position so that the central web 68 of each T-bar is disposed in an upwardly extending relationship. This exposes the narrow upper edge of the web 68 for engagement by the grooves 36A of the guide rollers 36, and it also disposes the cross member or flange of the T-bar in position for convenient use in associating the rails 30 with the mounting posts 31. Thus, as shown in Figs. 3, 5 and 6, each mounting post 31 is associated with the rail 30 that is to be carried thereby through the use of a connecting fitting 70 that is secured to the lower face of the rail by means such as bolts 71. Each connecting fitting 70 has a downwardly projecting mounting web 72 that is disposed in a plane parallel to the web 68 of the rail, but as will be observed in Fig. 6 of the drawings, the web 72 is in the present instance disposed in a different plane than the web 68 for by this arrangement, the mounting post 31 that is to be associated with the web 72 will be located in such a way that it may bear against the adjacent side wall of the car as shown in Fig. 3 of the drawing. This arrangement simplifies the fastening of the posts 31 in an upright relationship against the wall of the car. In the present instance the post 31 may be secured to the side wall of the car by means such as nails 73 that are driven through openings 74 that are provided in the posts 31. A relatively large number of such openings 74 are preferably provided so that at least one such opening 74 will invariably be located opposite a suitable securing surface even though there may be a wide variation in the location of the wood lining in steel cars that are encountered in use.

In associating the upper ends of the posts 31 with the webs 72 of the respective fittings 70, each post has a slot 75 formed in its upper end to receive the web 72 of one of the fittings. When a post 31 has been placed in position with the web 72 disposed within the slot 75, the post is secured in this relationship by a bolt 76 that extends through an opening formed in one side of the post and through an opening formed in the web 72, and the end of the bolt is then threaded into the other side of the post as indicated at 77 in Fig. 6. Thus the posts 31 may be readily connected to or disconnected from the fittings 70 and this arrangement enables the apparatus to be conveniently mounted in or removed from a car. In many instances, it has been found that complete removal or detachment of all of the posts 31 from the rail 30 is not required, and in the embodiment of the invention herein shown, where each rail is supported by four equally spaced posts 31, it has been found that detachment of the two end posts 31 is all that is required in most instances, and to facilitate handling of the rail 30 with the two intermediate posts 31 connected thereto, the association of these two posts 31 with the fittings 70 is accomplished in such a manner that these posts may be pivoted into positions wherein they lie parallel to the rail 30. More specifically, as viewed in Fig. 1 of the drawings, the right-hand one of the two intermediate posts 31 is arranged so that it may be pivoted in a counterclockwise direction so as to be located parallel to the rail 30, and adjacent to the right-hand end thereof. Similarly, the left-hand one of the two intermediate posts 31 is arranged for pivotal movement in a clockwise direction as viewed in Fig. 1. Thus when the two end posts 31 have been removed, the workmen may fold the intermediate posts toward opposite ends of the rail 30 and may hold these posts in positions parallel to the rail 30 while the assembly is being moved into or out of the car. It will be recognized, however, that there may be instances where the two intermediate posts must be disconnected in order to enable such posts to be removed from a loaded car. The desired pivotal association of the two intermediate posts 31 with the rail 30 may be accomplished through the use of the structures shown in Figs. 5 and 6 of the drawings, and as there shown, one lower corner of the web 72 is rounded as at 78 so as to provide clearance for movement of the post 31 about the pivot afforded by the bolt 76.

It should be observed in this regard that the posts 31 may be conveniently formed from ordinary pipe, and when this is done, the slot 75 takes the form of aligned slots in opposite sides of the pipe. With this construction means may easily be provided to prevent pivotal movement of the two intermediate legs toward each other, and as shown in Fig. 5, the slot is formed of such a depth at 75A that it engages the lower edge 72A of the web when the post is in its vertical relation.

In the use of the apparatus of this invention for the purpose of loading a car, such apparatus is first set up in one end of the car so that the articles such as the forgings F may be loaded and distributed in this end of the car, and the apparatus is then moved so as to extend from the door 17 to the other end of the car so that such other end may be similarly loaded. In the erection of the apparatus within the car, one of the rails 30, preferably having the two intermediate posts 31 attached thereto, is moved endwise through the door into the car and is positioned against one side of the car with the posts 31 bearing against the side wall of the car and resting upon the floor thereof. The two posts 31 and the rail 30 are then secured in position through the driving of a nail 73 through one of the openings 74 and into the side wall of the car, and it will be observed that the limiting action of the surfaces 72A and 75A on the two posts 31 serves to prevent undesired shifting of the rail 30 in an endwise direction. The other two legs or posts 31 may then be put into position beneath the opposite ends of the rail and the connecting bolts 76 may be put in position. The other side rail 30 is then placed in position along the other side of the car in the same manner, and the apparatus is then in condition for mounting of the cross beam 35 on the rails 30. In accomplishing such mounting, the relatively heavy hoist 40 is detached from the cross beam by the releasing of the hook 41 from the opening 48 of the plate 47, and thus the weight of the cross beam structure is materially reduced so as to thereby enable two workmen to lift and position the cross beam 35 on the rails 30. In the event that the width of the car is different than the width of the last car in which the apparatus has been used, the two mounting members 58 are readjusted so that the grooves 36A in the rollers at opposite ends are spaced apart in a distance that is equal to the spacing of the webs 68 of the two rails. After securing the members 58 in position by tightening the clamping screws 65, the workmen may lift the cross beam 35 and place it in position with the grooved wheels or rollers 36 riding upon the rails 30. The hoist 40 may then be mounted in position on the roller carriage 38, thereby completing the erection of the apparatus.

The first box 20 of the articles such as the castings F may then be moved into position in the central portion of the car 10, and the hoist may be moved into position over the box 20 for the purpose of lifting one of the forgings out of the box. Such location of the hoist 40 may be readily accomplished through movement of the cross beam along the rails 30 and by movement of the roller carriage 38 along the cross beam 35. After the forging F has been engaged by the tongs 40B and has been lifted out of the box, a workman, by grasping the hook 40A, may move the hoist from the center of the car toward the end thereof. In the course of such movement the cross beam 35 moves along the rails 30, while the operator may move the roller carriage 38 along the beam 35 so as to transport the forging F to the desired location in the end of the car. The forging F is then lowered into position and is released from the tongs 40B. The operation is, of course, repeated with respect to all of the forgings F, and it will be observed that the desired uniform distribution of the castings may be readily attained because of the full range of movement of the hoist both longitudinally and laterally of the car 10.

After one end of the car 10 has been completely loaded, the hoist 40 is removed from the roller carriage 38, and the cross beam 35 is removed from the rails 30. The rails 30 are then moved lengthwise of the car so as to be located in the other end of the car, and in such moving operations, one or more of the supporting posts 31 may be detached from the rail 30 as this is required in order to release such post or posts from the space between the forgings F and the side of the car. The cross beam 35 and the hoist 40 are then put in their operative relationship as hereinbefore described so that the loading of the other end of the car may be accomplished. After the loading of the car has been completed, the apparatus is again dismantled and removed from the car. In such removal, the posts 31 may be detached from the rails 30, or in the event that the posts are free from wedging contact with the forgings F, at least some of the posts 31 may be left in attached relationship with respect to the rails 30 in the manner hereinbefore described.

In the event that the apparatus of this invention is to be utilized for the purpose of unloading a car, a substantially similar procedure is employed, and it has been found in practice that through the use of the equipment of this invention, the effective loading or unloading time may be reduced as much as seventy-five percent, and the hazards of the usual lifting and carrying operations are eliminated.

From the foregoing it will be evident that the present invention materially simplifies the loading and unloading of box-cars and the like, and it will also be evident that such loading and unloading operations may be performed by the apparatus of this invention with a substantial saving of time and cost.

Thus while I have illustrated and described a selected embodiment of my invention, it is to be understood that this is capable of variation and modification and I therefore do not wish to be limited to the precise details set forth but desire to avail myself of such changes and alterations as fall within the purview of the following claims.

I claim:

1. In a material-handling apparatus for loading or unloading boxcars and the like, a pair of elongated side rails adapted to be disposed in elevated horizontal positions along the opposite inner side surfaces of a boxcar or the like so as to extend from the side door of such a car to an end thereof, a plurality of posts for supporting each of said side rails and adapted to rest at their lower ends on the floor of a car, cooperating means on the upper ends of said posts and on the lower sides of said rails at spaced points therealong for detachably associating said posts with said side rails in supporting relation thereto so as to support said rails in parallel elevated positions, and a cross rail having rollers at opposite ends to ride on the respective side rails and having flanges on said rollers engaged with the inner faces of said rails to maintain the same separated and thereby hold said posts in upright positions.

2. In a material-handling apparatus for loading or unloading boxcars and the like, a pair of elongated side rail units each comprising a rail and a plurality of detachably related supporting posts adapted to be disposed with the units against the opposite inner side surfaces of a boxcar or the like with the lower ends of the posts resting on the floor of the car and with the rails supported by the posts so as to extend from the side door of such a car to an end thereof, and a cross rail unit affording a track adapted to support and guide a roller carriage mounted thereon for movement therealong, said cross rail unit having rollers at opposite ends thereof adapted to ride in a laterally interlocked relationship upon said rails.

3. In a material-handling apparatus for loading or unloading boxcars and the like, a pair of elongated side rails each having a track and each having a plurality of mounting fittings secured at spaced points therealong, a plurality of supporting posts engaged with the respective fittings for supporting said rails in elevated positions along the opposite inner sides of a boxcar or the like, means including connecting pins securing said posts to said fittings and arranged to enable at least certain of said posts to be pivoted into parallel relation with respect to the rail to which they are connected, and a cross beam having grooved rollers at opposite ends thereof riding in laterally interlocked relationship on the respective tracks of said side rails, said cross beam being adapted to have a hoist-supporting roller carriage mounted and guided thereon.

4. In a material-handling apparatus for loading or unloading boxcars and the like, a pair of elongated side rails each having a track and each having a plurality of mounting fittings secured at spaced points therealong, a plurality of supporting posts engaged with the respective fittings for supporting said rails in elevated positions along the opposite inner sides of a boxcar or the like, means securing said posts to said fittings and arranged for detachment of at least certain of said posts from said fittings, a cross beam having grooved rollers at opposite ends thereof riding in laterally interlocked relation on the respective tracks of said side rails, means adjustably connecting said rollers to said cross beam to enable adjustment of the spacing thereof to be effected and serving by its weight to hold said grooved rollers in laterally interlocked relation to said tracks of said side rails, and a roller carriage mounted on said cross beam for movement therealong.

5. In a material-handling apparatus for loading or unloading boxcars and the like, a pair of elongated side rails each having a track and each having a plurality of mounting fittings secured at spaced points therealong, a plurality of supporting posts engaged with the respective fittings for supporting said rails in elevated positions along the oppostie inner sides of a boxcar or the like, means including connecting pins securing said posts to said fittings and arranged to enable two of the posts on each rail to be pivoted in opposite directions into parallel relation with respect to the rail to which they are connected, means operable to limit return movement of each of said pivotally connected posts to a right angular relationship with respect to the rail supported thereby, and a cross beam adapted to support and guide a hoist-supporting roller carriage and having grooved rollers at opposite ends thereof riding in laterally interlocked relation on the respective tracks of said side rails.

6. In a material-handling apparatus for loading or unloading boxcars and the like, an elongated side rail having a track and having a pluraltiy of mounting fittings secured at spaced points therealong, a plurality of supporting posts engaged with the respective fittings for supporting said rail in an elevated position along an inner side of a boxcar or the like, means including connecting pins securing said posts to said fittings and arranged to enable two of the posts on said rail to be pivoted in opposite directions into parallel relation with respect to the rail to which they are connected, and means operable to limit return movement of each of said pivotally connected posts to a right angular relationship with respect to the rail.

OTTO K. STAIGER.

REFERENCES CITED

The following references are of record in the file of this patent:

UNITED STATES PATENTS

| Number | Name | Date |
| --- | --- | --- |
| 1,341,996 | Plucienski | June 1, 1920 |
| 1,838,772 | Lawrence | Dec. 29, 1931 |
| 1,869,421 | Harris | Aug. 2, 1932 |
| 2,198,155 | Fahland | Apr. 23, 1940 |
| 2,294,999 | Mitchell | Sept. 8, 1942 |